United States Patent [19]

Zyagawa et al.

US005750612A

[11] Patent Number: 5,750,612

[45] Date of Patent: May 12, 1998

[54] POLYPROPYLENE RESIN COMPOSITION FOR CAR INTERIOR FITTINGS

[75] Inventors: Yasutoshi Zyagawa; Takeyoshi Nishio; Takao Nomura, all of Aichi-ken; Tomohiko Akagawa, Oosaka-fu; Ikunori Sakai, Oosaka-fu; Saburou Hinenoya, Oosaka-fu, all of Japan

[73] Assignees: Toyota Jidosha Kabushiki Kaisha, Aichi-ken; Ube Industries, Ltd., Yamaguchi-ken, both of Japan

[21] Appl. No.: 801,416

[22] Filed: Feb. 18, 1997

Related U.S. Application Data

[63] Continuation of Ser. No. 498,405, Jul. 5, 1995, abandoned.

[30] Foreign Application Priority Data

Jul. 7, 1994 [JP] Japan ..................... 6-156161

[51] Int. Cl.$^6$ ............................. C08L 23/06; C08L 25/10
[52] U.S. Cl. ............................. 524/451; 525/98; 525/89
[58] Field of Search ................... 525/89, 98; 524/451

[56] References Cited

U.S. PATENT DOCUMENTS

| | | | |
|---|---|---|---|
| 4,006,116 | 2/1977 | Dominguez | 525/89 |
| 4,737,536 | 4/1988 | Kawase | 524/451 |
| 4,769,415 | 9/1988 | Hotta | 525/89 |
| 4,892,903 | 1/1990 | Himes | 524/488 |
| 5,256,734 | 10/1993 | Sugihara | 525/98 |
| 5,260,366 | 11/1993 | Mitsuno | 524/426 |
| 5,432,209 | 7/1995 | Sobajima | 523/200 |

FOREIGN PATENT DOCUMENTS

| | | |
|---|---|---|
| 0168203 | 1/1986 | European Pat. Off. . |
| 0 463 963 | 1/1992 | European Pat. Off. . |
| 0 509 662 | 10/1992 | European Pat. Off. . |
| 58-168649 | 10/1983 | Japan . |
| 61-12742 | 1/1986 | Japan . |
| 61-291247 | 12/1986 | Japan . |
| 63-150343 | 6/1988 | Japan . |
| 3-172339 | 7/1991 | Japan . |
| 4-57848 | 2/1992 | Japan . |

*Primary Examiner*—Irina S. Zemel
*Attorney, Agent, or Firm*—Young & Thompson

[57] ABSTRACT

Disclosed is a polypropylene resin composition for car interior fittings, comprising (a) a crystalline polypropylene, (b) particular hydrogenated block copolymer(s), (c) particular hydrogenated block copolymer(s) different from (b), and (d) a particular talc.

5 Claims, No Drawings

POLYPROPYLENE RESIN COMPOSITION FOR CAR INTERIOR FITTINGS

This application is a continuation of application Ser. No. 08/498,405, filed Jul. 5, 1995, now abandoned.

BACKGROUND OF THE INVENTION

1. Field of the Invention

The present invention relates to a polypropylene resin composition consisting essentially of a crystalline polypropylene, which has good shapability and gives lightweight and rigid shaped objects with high thermal deformation resistance and impact resistance and good outward appearance and which is suitable especially for forming car interior fittings such as instrument panels, trims, pillars, etc.

2. Description of Related Art

Heretofore, a reinforced polypropylene resin composition consisting essentially of a polypropylene resin combined with various rubber components such as ethylene-α-olefin copolymer rubbers, thermoplastic elastomers, etc. and an inorganic filler has been popularly used to form car interior fittings.

It has been proposed to improve the shapability of the composition and the rigidity, the impact resistance and the outward appearance of the shaped objects from the composition by varying the polypropylene resin, various rubber components and inorganic filler constituting the composition.

However, the polypropylene resin composition cannot satisfy the recent high-level requirements for the materials for car interior fittings, such as (i) and (ii) mentioned below, though giving shaped objects with only partially satisfactory physical properties.

(i) Car interior fittings is now required to be thinner and more lightweight while having higher rigidity, higher impact resistance and higher thermal deformation resistance.

(ii) Car interior fittings is also required to be noncoated, while having better outward appearance with few flow marks and welds and having higher scratch resistance.

No material totally and well-balancedly satisfying the above-mentioned requirements has been developed still as yet.

Under the situations, it is pushed to develop materials that satisfy the above-mentioned requirements.

Concretely mentioned are the prior arts disclosed in the following patent publications.

(1) Japanese Patent Laid-Open No. 58-168649

This relates to a reinforced polypropylene resin composition consisting of a crystalline ethylene-propylene block copolymer combined with an ethylene-α-olefin copolymer rubber and an inorganic filler has been popularly used to form car interior fittings. However, the objects shaped out of this have poor impact resistance and poor outward appearance with significant flow marks.

(2) Japanese Patent Laid-Open No. 3-172339

This relates to a reinforced polypropylene resin composition consisting of a crystalline ethylene-propylene block copolymer combined with a hydrogenated block copolymer rubber and/or an ethylene-propylene copolymer rubber along with an inorganic filler. However, the composition is not satisfactory in terms of the general properties, such as the thermal deformation resistance, the impact resistance and the outward appearance of the objects shaped out of this and the shapability of the composition.

(3) Japanese Patent Laid-Open Nos. 61-12742, 61-291247, 63-150343, 4-57848

These relates to reinforced polypropylene resin compositions each consisting of a crystalline ethylene-propylene block copolymer combined with a thermoplastic elastomer such as a hydrogenated block copolymer rubber and/or an ethylene-α-olefin copolymer rubber along with an inorganic filler. However, all of these are not satisfactory, since the objects shaped out of these have poor rigidity and poor thermal deformation resistance.

SUMMARY OF THE INVENTION

The present invention has been made on the basis of the technical themes in the prior arts which are directed to the provision of improved polypropylene resin compositions that have better shapability while giving shaped objects with improved mechanical properties such as rigidity, impact resistance and thermal deformation resistance and with improved outward appearance. Specifically, the object of the present invention is to provide a polypropylene resin composition material suitable for car interior fittings, which has good shapability and gives shaped objects with improved mechanical properties such as rigidity, impact resistance, thermal deformation resistance, etc. and with good outward appearance.

In order to attain the above-mentioned object, the present inventor has studied the polymer composition of crystalline polypropylenes and the particle size of talc particles to be in the composition as an inorganic filler and has assiduously studied so as to obtain an impact-resistance-improving agent that exhibits a large impact-resistance-improving effect while not detracting from the rigidity of shaped objects containing the agent.

As a result, the present inventor has found that the intended polypropylene resin composition consisting essentially of a crystalline polypropylene can be obtained by adding, to the polypropylene, a composite, hydrogenated block copolymer comprising a combination of particular hydrogenated block copolymer(s) having high compatibility with the polypropylene while exhibiting a high impact-resistance-improving effect and particular hydrogenated block copolymer(s) containing highly-rigid hard segments at a predetermined content or more, optionally along with an ethylene-α-olefin copolymer rubber component as an impact-resistance-improving agent, and a particular talc, followed by melting and mixing these.

Specifically, the present invention provides a polypropylene resin composition for car interior fittings comprising of (a) from 60 to 89% by weight of a crystalline polypropylene having a melt flow rate (at 230° C. under 2160 g) of from 7 to 70 g/10 minutes, (b) from 2 to 16% by weight of hydrogenated block copolymer(s) to be obtained by hydrogenating block copolymer(s) of general formula(e) A—(B—A)n and/or A—B (where A represents a polymer block of a monovinyl-substituted aromatic hydrocarbon; B represents a polymer block of a conjugated diene elastomer; n represents an integer of from 1 to 5), which has/have a melt flow rate (at 200° C. under 5 kg) of 5 g/10 minutes or more and in which the block A content is 22% by weight or less, at a degree of hydrogenation of 90 mol % or more, (c) from 2 to 16% by weight of hydrogenated block copolymer(s) to be obtained by hydrogenating block copolymer(s) of general formula(e) A—(B—A)n and/or A—B (where A represents a polymer block of a monovinyl-substituted aromatic hydrocarbon; B represents a polymer block of a conjugated diene elastomer; n represents an integer of from 1 to 5), which has/have a melt flow rate (at 200° C. under 5 kg) of 2 g/10 minutes or less and in which the block A content is 27% by weight or more, at a degree of hydrogenation of 90mol % or more, and (d) from 7 to 25% by weight of talc having a mean particle size of from 3 to 5 μm measured by laser diffraction.

One preferred embodiment of the polypropylene resin composition for car interior fittings is such that the crystalline polypropylene (a) is a crystalline ethylene-propylene block copolymer having an ethylene content of from 0.5 to 8% by weight, in which the polypropylene component has a boiling n-heptane-insoluble content of 95% by weight or more and the isotactic pentad fraction in the boiling n-heptane-insoluble moiety is 0.970 or more. More preferably, the crystalline ethylene-propylene block copolymer has a room-temperature p-xylene-soluble content of from 4 to 20% by weight, and the room-temperature p-xylene-soluble moiety has an ethylene content of from 20 to 45% by weight and has a intrinsic viscosity (at 135° C. in decalin) of 4 dl/g or more.

Another preferred embodiment of the polypropylene resin composition for car interior fittings is such that the ratio of the hydrogenated block copolymer(s) (b) to the hydrogenated block copolymer(s) (c), (b)/(c) is from 0.25 to 4.0, especially preferably from 0.50 to 2.0.

Still another preferred embodiment of the polypropylene resin composition for car interior fittings additionally contains from 0 to 200 parts by weight, relative to 100 parts by weight of the sum of the hydrogenated block copolymers (b) and (c), of an ethylene-propylene copolymer rubber (e) having an ethylene content of from 60 to 80% by weight and a Mooney viscosity, ML 1+4 (at 100° C.) of from 10 to 70, and/or an ethylene-propylene-diene copolymer rubber (f) having an ethylene content of from 60 to 80% by weight, and/or an ethylene-butene copolymer rubber (g) having a butene content of from 10 to 25% by weight and a Mooney viscosity, ML 1+4 (at 100° C.) of from 5 to 20.

The polypropylene resin composition of the present invention consists essentially of a crystalline polypropylene and comprises particular, composite hydrogenated block copolymers combined in terms of the balance of the rigidity and the impact resistance of the objects to be shaped out of the composition, and a particularly classified talc. The composition has improved fluidity and can be shaped into objects having improved rigidity in terms of the bending elasticity, the thermal deformation resistance and the surface hardness, well balanced with its improved Izod impact strength, while giving much reduced flow marks to the shaped objects.

The composition of the present invention is advantageously shaped into for car interior fittings which is required to have not only improved physical properties but also improved shapability, outward appearance and scratch resistance.

DETAILED DESCRIPTION OF THE
INVENTION

Component (a):

The crystalline polypropylene to be used in the present invention as the component (a) includes a crystalline homo-polypropylene to be obtained by one-step homopolymerization and a crystalline ethylene-propylene block copolymer which is a mixture comprising such a crystalline homo-polypropylene to be obtained by one-step polymerization and an ethylene-propylene copolymer (hereinafter referred to as "E/P copolymer rubber") to be obtained by two-step copolymerization. These (co)polymers are generally obtained by (co)polymerizing (co)monomers in the presence of a combined catalyst of a so-called Ziegler-Natta catalyst comprising a combination of titanium trichloride and an alkyl aluminium compound or of a composite catalyst comprising a magnesium compound or a titanium compound.

The crystalline homo-polypropylene to be obtained by one-step homopolymerization of propylene must be highly one-step homopolymerization of propylene must be highly crystalline in terms of the rigidity, the thermal deformation resistance and the scratch resistance of the objects to be shaped out of the polypropylene resin composition. This must have a boiling n-heptane-insoluble content of 95% by weight or more, and the isotactic pentad fraction in the boiling n-heptane-insoluble moiety in this is preferably 0.970 or more. If the boiling n-heptane-insoluble content in the homo-polypropylene is less than 95% by weight, the rigidity, the thermal deformation resistance and the scratch resistance of the objects to be shaped out of the composition containing the homo-polypropylene are unsatisfactory.

The boiling n-heptane-insoluble content as referred to herein corresponds to the residue to be obtained by putting the crystalline homo-polypropylene obtained by one-step polymerization into a cylindrical filter set in a Soxhlet's extractor, followed by boiling and extracting the polymer with n-heptane for 6 hours. The isotactic pentad fraction as referred to herein indicates the isotactic chain to be measured by 13C-NMR in terms of the pentad unit in the crystalline polypropylene molecular chain, which corresponds to the fraction of the propylene monomer unit existing in the center of directly mesobonded five propylene monomer units in the molecular chain. Concretely, the fraction is obtained as the mmmm peak fraction of all the absorption peaks in the methyl carbon region in the 13C-NMR spectrum of the polymer.

Where a crystalline ethylene-propylene block copolymer is used as the crystalline polypropylene, it is desirable that the copolymer has an ethylene content of from 0.5 to 8% by weight, especially preferably from 2 to 5% by weight.

The ethylene content as referred to herein is obtained as follows: First, the crystalline ethylene-propylene block copolymer is shaped under hot pressure into a filmy test piece, the test piece is subjected into infrared spectrophotometry to obtain its infrared absorption spectrum, and the characteristic absorbance at the methyl group (—CH$_3$) and that at the methylene group (—CH$_2$—) in the spectrum are obtained, from which the ethylene content in the polymer is calculated with reference to the calibration curve.

The crystalline ethylene-propylene block copolymer preferably has a room-temperature p-xylene-soluble content (comprising a low-molecular polymer and the E/P copolymer rubber to be obtained by the above-mentioned two-step copolymerization) is from 4 to 20% by weight, more preferably from 5 to 12% by weight. The ethylene content in the room-temperature p-xylene-soluble moiety is preferably from 20 to 45% by weight, more preferably from 25 to 40% by weight.

The room-temperature p-xylene-soluble moiety in the copolymer shall have a intrinsic viscosity (at 135° C. in decalin) [η] of 4 dl/g or more, preferably 5 dl/g or more.

The room-temperature p-xylene-soluble content as referred to herein is obtained as follows: First, 5 g of the crystalline ethylene-propylene block copolymer are completely dissolved in boiling p-xylene, then cooled to 20° C. and left as it is for one full day. Afterwards, this is filtered to separate the p-xylene-insoluble moiety. 1500 cc of acetone are added to the filtrate and stirred to make a p-xylene-soluble polymer precipitated. The p-xylene-soluble polymer is taken out by filtration and dried. The ethylene content in the p-xylene-soluble moiety as referred to herein is obtained as follows: A filmy test piece that has been shaped out of the copolymer under hot pressure is subjected into infrared spectrophotometry to obtain its infrared absorption spectrum, and the characteristic absorbance at the methyl group (—$CH_3$, 1155 $cm^{-1}$) and that at the methylene group (—$CH_2$—) in the spectrum are obtained, from which the ethylene content in the moiety is calculated with reference to the Gardner's calibration curve (see I. J. Gardner et al., Rubber Chem & Tech 44, 1015, '71).

The crystalline polypropylene has a melt flow rate (at 230° C., 2160 g) of from 7 to 70 g/10 minutes, preferably from 10 to 45 g/10 minutes. If the melt flow rate is smaller than 7 g/10 minutes, the fluidity of the composition during shaping is poor with the result that the shaping cycle is prolonged and the shaped objects have flow marks to worsen their outward appearance. If it is larger than 70 g/10 minutes, the objects shaped out of the composition have poor impact resistance.

Component (b):

The hydrogenated block copolymer component (b) to be in the composition of the present invention is obtained by hydrogenating block copolymer(s) of general formula(e) A—(B—A)n and/or A—B, which has/have a melt flow rate (at 200° C. under 5 kg) of 5 g/10 minutes or more and in which the block A content is 22% by weight or less. In these general formulae, A represents a polymer block of a monovinyl-substituted aromatic hydrocarbon; B represents a polymer block of a conjugated diene elastomer; and n represents an integer of from 1 to 5.

The monovinyl-substituted aromatic hydrocarbon monomer constituting the polymer block A is preferably styrene but may also be any of α-methylstyrene, vinyl-toluene, other lower alkyl-substituted styrenes and vinylnaphthalene.

The conjugated diene monomer constituting the polymer block B is preferably butadiene or isoprene but may also be a mixture of these. Where the polymer block B in the block copolymer is derived from a single conjugated diene monomer of butadiene, it is desirable that the block copolymer is prepared under particular copolymerization condition to have a 1,2-microstructure content of from 20 to 50% in the polybutadiene blocks in order that the block copolymer can be completely hydrogenated into an elastomeric hydrogenated block copolymer. More preferably, the 1,2-microstructure content in the blocks is from 35 to 45%.

Many methods have been proposed to produce the block copolymer of this type. One typical method is disclosed in Japanese Patent Publication No. 40-23798, in which block copolymerization is conducted in the presence of a lithium catalyst or a Ziegler catalyst in an inert solvent.

The hydrogenation of the block copolymer may be effected according to known methods such as those described in Japanese Patent Publication Nos. 42-8704, 43-6636 and 46-20814. For example, the block copolymer may be hydrogenated in the presence of a catalyst in an inert solvent. By such hydrogenation, at least 90%, preferably 95% or more of the double bonds in the block copolymer are hydrogenated to make the block copolymer into a hydrogenated block copolymer.

The content of the polymer block A in the hydrogenated block copolymer (b) is 22% by weight or less, preferably from 10 to 20% by weight. If the content of the polymer block A is more than 22% by weight, the rubber-like properties and the compatibility with polypropylene of the hydrogenated block copolymer (b) are lowered with the result that the impact resistance of the objects to be shaped out of the composition is lowered.

The hydrogenated block copolymer (b) has a melt flow rate (at 200° C. under 5 kg) of 5 g/10 minutes or higher, preferably from 5 to 30 g/10 minutes. If the melt flow rate is lower than 5 g/10 minutes, the fluidity of the composition is lowered with the result that the outward appearance of the objects shaped out of the composition is worsened due to the increased flow marks.

The hydrogenated block copolymer (b) includes, for example, styrene-ethylene-butylene-styrene copolymer (SEBS), styrene-ethylene-propylene-styrene copolymer (SEPS), styrene-ethylene-propylene copolymer (SEP), etc. Of these, preferred is SEBS.

Component (c):

The hydrogenated block copolymer component (c) to be in the composition of the present invention is obtained by hydrogenating block copolymer(s) of general formula(e) A—(B—A)n and/or A—B, which has/have a melt flow rate (at 200° C. under 5 kg) of 2 g/10 minutes or lower and in which the block A content is 27% by weight or more. In these general formulae, A represents a polymer block of a monovinyl-substituted aromatic hydrocarbon; B represents a polymer block of a conjugated diene elastomer; and n represents an integer of from 1 to 5.

Regarding the monomers constituting the polymer blocks A and B in the hydrogenated block copolymer (c) and the method for producing the hydrogenated block copolymer (c) by hydrogenation, those for the component (b) are referred to.

The content of the polymer block A in the hydrogenated block copolymer (c) is 27% by weight or more, preferably from 30 to 50% by weight. If the content of the polymer block A is less than 27% by weight, the hard segment content in the hydrogenated block copolymer (c) is lowered with the result that the rigidity and the thermal deformation resistance of the objects to be shaped out of the composition are lowered.

The hydrogenated block copolymer (c) has a melt flow rate (at 200° C. under 5 kg) of 2 g/10 minutes or lower, preferably from 0.05 to 2 g/10 minutes. If the melt flow rate is higher than 2 g/10 minutes, the impact resistance of the objects to be shaped out of the composition is lowered.

The hydrogenated block copolymer (c) includes, for example, styrene-ethylene-butylene-styrene copolymer (SEBS), styrene-ethylene-propylene-styrene copolymer (SEPS), styrene-ethylene-propylene copolymer (SEP), etc. Of these, preferred are SEBS and SEP.

The composition of the present invention indispensably contains the combination of the hydrogenated block copolymer component (b) and the hydrogenated block copolymer component (c), preferably at a ratio, (b)/(c) by weight of from 0.25 to 4.0, more preferably from 0.5 to 2.0. The component (b) and the component (c) each need not be a single component but may be comprised of plural components.

The component (b) and the component (c) that have been combined and added to the composition at the ratio falling within the above-mentioned range are dispersed in the polypropylene in the composition to give therein a dispersion phase structure where the component (c) is covered up with the component (b), and the dispersion phase structure results in the improvement in the physical properties of the objects to be shaped out of the composition in terms of the balance between the rigidity and the thermal deformation resistance and the impact resistance.

If the composition does not contain the combination of the component (b) and the component (c) but contains only the component (b), the rigidity and the thermal deformation resistance, especially the latter of the objects to be shaped out of the composition are bad even though the impact resistance of the objects is good. On the other hand, if the composition contains only the component (c), the impact resistance, especially that at low temperatures of the objects to be shaped out of the composition is extremely bad.

Component (d):

The talc (d) to be in the polypropylene resin composition of the present invention has a mean particle size of from 3 to 5 µm when measured by laser diffraction, preferably has a mean particle size of from 3 to 5 µm and a top-cut size of less than 20 µm when measured by laser diffraction and a BET specific surface area of from 5 to 13 $m^2/g$. The composition contains the talc (d) in an amount of from 7 to 25% by weight.

The mean particle size and the top-cut size of the talc as referred to herein were measured with a microtrack particle size distribution meter (7995-40DRA Model, produced by Nikkiso Co.) according to the Fraunhofer diffraction formula for front-scattering laser rays and to the side-scattering halogen ray intensity diffraction formula.

Fine talc having a mean particle size of smaller than 3 µm has a small mean aspect ratio and therefore its effect to improve the rigidity of the objects to be shaped out of the composition containing it is poor. However, if the composition contains coarse talc having a mean particle size of larger than 5 µm, the objects to be shaped out of the composition have poor impact strength and, in addition, the effect of the talc to improve the rigidity of the objects is poor.

The top-cut size of talc as referred to herein means the particle size of the largest particles of the talc. It is desirable that the top-cut size of the talc for use in the present invention is smaller than 20 µm. To measure the BET specific surface area of talc as referred to herein, talc is made to adsorb nitrogen at a liquid nitrogen temperature (77° K.), the physical adsorption amount of nitrogen is measured, and the specific surface area of the talc is obtained from the thus-measured amount according to the BET theory. The amount of nitrogen adsorbed by talc at the liquid nitrogen temperature is obtained by the use of Monosorb MS-12 Model (produced by Yuasa Ionics Co.). It is desirable that the BET specific surface area of the talc for use in the present invention is preferably from 5 to 13 $m^2/g$.

The talc for use in the present invention can be produced by grinding talc ore with a known grinder such as a roller mill, a crusher, etc. to a talc powder nearly having a predetermined mean particle size followed by classifying the powder with a known dry classifier to thereby remove particles not falling within a mean particle size range of from 3 to 5 µm. Alternatively, the talc powder may be classified while being re-ground with the known grinder.

The talc for use in the present invention may be surface-treated with various treating agents, as far as the surface treatment is not against the object of incorporating the talc into the composition. The surface treatment may be physical or chemical surface treatment to be effected with surface-treating agents which include, for example, silane coupling agents, higher fatty acids, metal salts of fatty acids, unsaturated organic acids and their derivatives, organic titanates, resin acids, etc.

The composition of the present invention comprises from 60 to 89% by weight of the crystalline polypropylene (a), from 2 to 16% by weight of the hydrogenated block copolymer component (b), from 2 to 16% by weight of the hydrogenated block copolymer component (c) and from 7 to 25% by weight of the talc (c). If the content of the hydrogenated block copolymer component (b) and that of the hydrogenated block copolymer component (c) each are less than 2% by weight, the effect of these components to improve the impact resistance of the objects to be shaped out of the composition is poor. However, if the contents each are more than 16% by weight, the rigidity and the thermal deformation resistance of the objects to be shaped out of the composition are poor. If the content of the talc (d) is less than 7% by weight, its effect to improve the rigidity of the objects to be shaped out of the composition is poor. However, if the content is more than 25% by weight, the impact resistance of the objects to be shaped out of the composition is lowered and, in addition, the incorporation of such a large amount of the talc does not meet the requirement of making the objects lightweight and is therefore not employable.

If desired, the polypropylene resin composition of the present invention comprising the above-mentioned components (a), (b), (c) and (d) may additionally contain from 0 to 200 parts by weight, preferably from 0 to 100 parts by weight, relative to 100 parts by weight of the sum of the hydrogenated block copolymers (b) and (c), of an ethylene-propylene copolymer rubber (e) having an ethylene content of from 60 to 80% by weight and a Mooney viscosity, ML 1+4 (at 100° C.) of from 10 to 70, and/or an ethylene-propylene-diene copolymer rubber (f) having an ethylene content of from 60 to 80% by weight, and/or an ethylene-butene copolymer rubber (g) having a butene content of from 10 to 25% by weight and a Mooney viscosity, ML 1+4 (at 100° C.) of from 5 to 20. If the content of these ethylene-α-olefin copolymer rubbers is more than 200 parts by weight, the effect of the hydrogenated block copolymers in the composition is retarded with the result that the balance between the rigidity, the thermal deformation resistance and the impact resistance of the objects to be shaped out of the composition is lost.

To produce the polypropylene resin composition of the present invention, the crystalline polypropylene (a), the hydrogenated block copolymer component (b), the hydrogenated block copolymer component (c) and the talc (d) and optionally the ethylene-α-olefin copolymer rubbers (e, f, g) are blended at the above-mentioned ratios by various known methods using, for example, a Henschel mixer, a V-blender, a ribbon blender, etc., and then melt-mixed and pelletized through a single-screw extruder, a double-screw extruder, a double-screw extruder equipped with a material-feeding mouth in the cylinder part in addition to the ordinary material-feeding mouth, a kneader, a Banbury mixer, etc.

In order to further improve the properties of the objects to be shaped out of the resin composition of the present invention and to make the objects generally have the necessary functions in accordance with their use, various additives may be added to the composition during mixing or after having mixed the constitutive components. Such additives include, for example, an antioxidant, an ultraviolet absorbent, a photo-stabilizer, a pigment, a dispersing agent, a coatability-improving agent, a shapability-improving agent, an antistatic agent, a lubricant, a nucleating agent, a releasing agent, etc.

It is especially desirable to add an antioxidant, an ultraviolet absorbent, a photo-stabilizer and a pigment to the composition.

The antioxidant includes, for example, 2,6-ditert-butylphenol, 2,6-ditert-butyl-4-ethylphenol, 2,6-ditert-butyl-4-n-butylphenol, 2,6-ditert-butyl-α-dimethylamino-p-cresol, 6-(4-hydroxy-3,5-ditert-butylaniline)-2,4- bisoctylthio-1,3,5-triazine, n-octadecyl 3-(4'-hydroxy-3',5'-ditert-butylphenyl)propionate, tris-(2-methyl-4-hydroxy-5-tert-butylphenyl)butane, tetrakis-[methylene-3-(3',5-ditert-butyl-4'-hydroxyphenyl)propionate-methane, 1,3,5-trimethyl-2,4,6-tris(3,5-ditert-butyl-4-hydroxybenzyl) benzene, dilaurylthio dipropionate, etc.

The ultraviolet absorbent and the photo-stabilizer include, for example, 2-hydroxy-4-n-octoxybenzophenone, 2-hydroxy-4-octadecyloxybenzophenone, 4-dodecyloxy-2-hydroxybenzophenone, 2-(2'-hydroxy-3'-tert-butyl-5'-methylphenyl)-5-chlorobenzotriazole, bis-(2,2,6,6-tetramethyl-4-pyridyl) sebacate, 1,2,3,4-butanetetracarboxylic acid-1,2,2,6,6-pentamethyl-4-piperidinol-tridecyl alcohol condensate, etc.

The present invention is described in more detail by means of the following examples, which, however, are not whatsoever intended to restrict the scope of the present invention. Methods for measuring the physical data of the products produced in the following examples are mentioned below. The test pieces that had been used for measuring their mechanical properties were shaped out of the compositions produced in the examples, by injection molding with an injection molding machine, J100SAII Model (Nippon Seiko-sho Co.) at a fixed cylinder temperature of 210° C. and a mold temperature of 40° C.

(1) Melt Flow Rate (MFR):

This was measured according to the method of ASTM D1238.

(2) Modulus of Bending Elasticity:

This was measured according to the method of ASTM D790.

(3) Izod Impact Strength:

This was measured at 23° C. according to the method of ASTM D256.

(4) Thermal Deformation Temperature:

This was measured under a fiber stress of 18.5 kg/cm$^2$, according to the method of ASTM D648.

(5) Surface Hardness:

This was measured according to the method of ASTM D685, where R was used as the steel ball and the data were based on the R scale.

(6) Brittle Temperature:

This was measured according to the method of ASTM D746.

(7) Spiral Flow Length:

The test composition was subjected to injection molding to measure its spiral flow length, using a resin flow length measuring mold equipped with a spiral flow duct having a thickness of 3 mm, a width of 10 mm and a length of 2000 mm. The injection molding was conducted, using an injection molding machine, M100SJ Model (produced by Meiki Seisaku-sho Co.), at a fixed cylinder temperature of 210° C. and a mold temperature of 40° C. under an injection pressure of 600 kg/cm$^2$, for an injection time of 10 seconds and a cooling time of 30 seconds.

(8) Percentage of Generation of Flow Marks:

Flow marks are regular ridgy stripes to be formed on the surface of a shaped object in the direction perpendicular to the direction of the resin flow, which are caused by the failure of faithful transfer of the surface of the mold used onto the surface of the shaped object and which are of a micron order. The percentage of the generation of flow marks as referred to herein is represented by the ratio of the spiral flow length (see the foregoing item (7)) at which flow marks began to appear to the whole flow length.

Raw materials used in the following examples and comparative examples are mentioned below.

(1) Crystalline Polypropylenes:

The compositions of the crystalline polypropylenes used in the examples and comparative examples are shown in Table 1.

TABLE 1

| Crystalline Polypropylenes | | | | |
|---|---|---|---|---|
| | P-1 | P-2 | *P-3 | *P-4 |
| MFR (g/10 min.) | 20 | 20 | 3 | 80 |
| Ethylene Content (wt %) | 3.0 | — | 3.2 | 2.9 |
| n-heptane-insoluble Content (wt %) | 96.5 | 97.5 | 96.0 | 96.8 |

*Comparative Example (2) Hydrogenated Block Copolymers:

The compositions and the polymer types of the hydrogenated block copolymers used in the examples and comparative examples are shown in Table 2.

TABLE 2

| | Hydrogenated Block Copolymers | | | | | | | | |
|---|---|---|---|---|---|---|---|---|---|
| | (b) R-1 | (c) R-2 | (c) R-3 | (b) R-4 | (c) R-5 | (c) R-6 | *R-7 | *R-8 | *R-9 |
| MFR (g/10 min.) | 9 | 0.2 | 0.2 | 29 | 0.1 | 0.1 | 1 | 10 | 20 |
| Content of A (wt %) | 13 | 30 | 37 | 19 | 30 | 35 | 13 | 30 | 35 |
| Polymer Type | SEBS | SEBS | SEP | SEBS | SEBS | SEP | SEBS | SEBS | SEP |
| | | | ↓ | | ↓ | | | | |
| | | | A – B | | A – (–B – A), n = 1 | | | | |

*Comparative Example (3) Ethylene-α-olefin Copolymer Rubbers:

R-10: Ethylene-propylene copolymer rubber having a Mooney viscosity, ML 1+4 (at 100° C.) of 40 and a propylene content of 25% by weight (EP931SP, produced by Nippon Synthetic Rubber Co.).

R-11: Ethylene-butene-1 copolymer rubber having a Mooney viscosity, ML 1+4 (at 100° C.) of 13 and a butene-1 content of 13% by weight (EBM2041P, produced by Nippon Synthetic Rubber Co.).

R-12: Ethylene-propylene-diene copolymer rubber having a Mooney viscosity, ML 1+4 (at 100° C.) of 80, a propylene content of 25% by weight and an iodine value of 15% by weight (EP57P, produced by Nippon Synthetic Rubber Co.).

(4) Talc Powders:
T-1: Classified talc powder having a mean particle size of 4.1 μm (produced by CALCEED Co., Ltd.)
T-2: Classified talc powder having a mean particle size of 6 μm (produced by CALCEED Co., Ltd.)

Examples 1 to 8, Comparative Examples 1 to 9:

Crystalline polypropylene, hydrogenated block copolymers, rubber component and talc were weighed according to the formulations shown in Tables 3, 4 and 5 and mixed in a tumbler mixer along with additives and pigments mentioned below, and the resulting mixture was melt-kneaded in a double-screw kneading extruder and pelletized therethrough. The resulting pellets were shaped into test pieces through an injection molding machine. These test pieces were subjected to tests for measuring their physical data.

The results obtained are shown in Tables 3, 4 and 5. It is known that the test pieces obtained in Comparative Examples 1, 3 and 9 are less rigid in terms of the modulus of bending elasticity, the thermal deformation temperature and the surface hardness than those obtained in the examples of the present invention, and therefore the former are inferior to the latter in terms of the balance between the rigidity and the impact resistance.

The test pieces obtained in Comparative Examples 2, 4, 6 and 8 have low impact resistance in terms of the Izod impact strength and the brittle temperature and are therefore also inferior to the test pieces obtained in the examples of the present invention in terms of the balance between the rigidity and the impact resistance.

The compositions of Comparative Examples 5 and 7 have poor fluidity, therefore causing significant flow marks on the test pieces. These compositions are not applicable to car interior fittings.

Additives:

| | |
|---|---|
| 2,6-Ditert-butyl-4-methylphenol | 0.1 phr |
| Tetrakis-[methylene-3-(3',5'-ditert-butyl-4'-hydroxyphenyl)propionate]methane | 0.2 phr |
| Bis-(2,2,6,6-tetramethyl-4-piperidyl) sebacate | 0.2 phr |
| Pigments: | |
| Iron oxide | 0.7 phr |
| Titanium oxide | 0.3 phr |

TABLE 3

Shapability of Compositions and Physical Properties and Outward Appearance of Shaped Samples

| | Example 1 | Example 2 | Example 3 | Example 4 | Example 5 | Example 6 | Example 7 | Example 8 |
|---|---|---|---|---|---|---|---|---|
| Formulation (wt. %) | | | | | | | | |
| Crystalline Polypropylene (a) | P-1(68) | P-1(68) | P-1(68) | P-1(68) | P-2(64) | P-1(68) | P-1(68) | P-1(68) |
| Hydrogenated Block Copolymer Component (b) | R-1 (6) | R-1 (6) | R-1 (6) | R-4 (6) | R-1 (8) | R-1 (6) | R-1 (6) | R-1 (6) |
| Hydrogenated Block Copolymer Component (c) | R-3 (6) | R-2 (6) | R-2 (3) R-3 (3) | R-5 (3) R-6 (3) | R-3 (8) | R-3 (2) R-10(4) | R-3 (2) R-11(6) | R-3 (2) R-12(4) |
| Talc (d) | T-1(20) | T-1(20) | T-1(20) | T-1(20) | T-1(20) | T-1(20) | T-1(20) | T-1(20) |
| MFR (g/10 min.) | 11.2 | 10.5 | 10.8 | 11.2 | 9.6 | 10.8 | 11.7 | 10.1 |
| Modulus of Bending Elasticity (kg/cm$^2$) | 25800 | 25500 | 25500 | 25300 | 26200 | 25200 | 25500 | 25200 |
| Izod Impact Strength (23° C.) (kg · cm/cm) | 38 | 30 | 34 | 32 | 38 | 31 | 28 | 28 |
| Thermal Deformation Temperature (°C.) | 84 | 83 | 83 | 82 | 86 | 82 | 84 | 82 |
| Surface Hardness (R) | 90 | 88 | 88 | 86 | 92 | 85 | 88 | 84 |
| Brittle Temperature (°C.) | −3.2 | −2.5 | −3.1 | −2.6 | −3.0 | −2.6 | −2.0 | −3.0 |
| Spiral Flow Length (cm) | 109 | 108 | 109 | 109 | 104 | 108 | 11o | 107 |
| Percentage of Generation of Flow Marks (%) | 20 | 21 | 20 | 21 | 23 | 23 | 19 | 29 |

TABLE 4

Shapability of Compositions and Physical Properties and Outward Appearance of Shaped Samples

| | Example 1 | Comparative Example 1 | Comparative Example 2 | Comparative Example 3 | Comparative Example 4 | Comparative Example 5 | Comparative Example 6 |
|---|---|---|---|---|---|---|---|
| Formulation (wt. %) | | | | | | | |
| Crystalline Polypropylene | P-1(68) | P-1(68) | P-1(68) | P-1(68) | P-1(68) | P-1(68) | P-1(68) |

TABLE 4-continued

Shapability of Compositions and
Physical Properties and Outward Appearance of Shaped Samples

|  | Example 1 | Comparative Example 1 | Comparative Example 2 | Comparative Example 3 | Comparative Example 4 | Comparative Example 5 | Comparative Example 6 |
|---|---|---|---|---|---|---|---|
| (a) |  |  |  |  |  |  |  |
| Hydrogenated Block Copolymer Component (b) | R-1 (6) | R-1(12) | — | R-1 (6) | R-7 (6) | R-7 (6) | R-9 (6) |
| Hydrogenated Block Copolymer Component (c) | R-3 (6) | — | R-3(12) | R-7 (6) | R-8 (6) | R-3 (6) | R-3 (6) |
| Talc (d) | T-1(20) | T-1(20) | T-1(20) | T-1(20) | T-1(20) | T-1(20) | T-1(20) |
| MFR (g/10 min.) | 11.2 | 12.0 | 9.5 | 10.8 | 11.8 | 8.5 | 11.7 |
| Modulus of Bending Elasticity (kg/cm$^2$) | 25800 | 23500 | 26000 | 23200 | 25600 | 25300 | 26100 |
| Izod Impact Sttength (23° C.)(kg · cm/cm) | 38 | 40 | 18 | 40 | 21 | 16 | 12 |
| Thermal Deformation Temperature (°C.) | 84 | 72 | 85 | 71 | 83 | 82 | 87 |
| Surface Hardness (R) | 90 | 78 | 92 | 75 | 89 | 86 | 91 |
| Brittle Temperature (°C.) | −3.2 | −3.5 | +3.0 | −3.5 | +1.0 | +2.6 | +5.1 |
| Spiral Flow Length (cm) | 109 | 110 | 102 | 105 | 109 | 99 | 112 |
| Percentage of Generation of Flow Marks (%) | 20 | 20 | 30 | 25 | 21 | 45 | 20 |

TABLE 5

Shapability of Compositions and Physical Properties and Outward Appearance Shaped Samples

|  | Example 1 | Comparative Example 7 | Comparative Example 8 | Comparative Example 9 |
|---|---|---|---|---|
| Crystalline Polypropylene (a) | P-1(68) | P-3(68) | P-4(68) | P-1(68) |
| Hydrogenated Block Copolymer Component (b) | R-1 (6) | R-1 (6) | R-1 (6) | R-1 (6) |
| Hydrogenated Block Copolymer Component (c) | R-3 (6) | R-3 (6) | R-3 (6) | R-3 (6) |
| Ethylene-α-olefin rubber |  |  |  |  |
| Talc (c) | T-1(20) | T-1(20) | T-1(20) | T-2(20) |
| MFR (g/10 min.) | 11.2 | 1.5 | 55 | 11.0 |
| Modulus of Bending Elasticity (kg/cm$^2$) | 25800 | 25000 | 25700 | 24700 |
| Izod Impact Strength (23° C.) (kg · cm/cm) | 38 | 40 | 10 | 18 |
| Thermal Deformation Temperature (°C.) | 84 | 78 | 86 | 83 |
| Surface Hardness (R) | 90 | 85 | 91 | 85 |
| Brittle Temperature (°C.) | −3.2 | −4.0 | +7.3 | +2.1 |
| Spiral Flow Length (cm) | 109 | 85 | 125 | 109 |
| Percentage of Generation of Flow Marks (%) | 20 | 68 | 19 | 20 |

What is claimed is:

1. A polypropylene resin composition for car interior fittings comprising:

(a) from 62 to 85% by weight of a crystalline polypropylene having a melt flow rate (at 230° C. under 2160 g) of from 10 to 45 q/10 minutes, (b) from 2 to 16% a by weight of hydrogenated block copolymer(s) obtained by hydrogenating block copolymer(s) of formula(e) A—(—B—A)n and/or A—B (where A represents a polymer block of a monovinyl-substituted aromatic hydrocarbon; B represents a polymer block of a conjugated diene elastomer; n represents an integer of from 1 to 5), and which has/have a melt flow rate (at 200° C. under 5 kg) of 5 g/10 minutes or more and in which the block A content is 22% by weight or less, at a degree of hydrogenation of 90 mol % or more, (c) from 2 to 16% by weight of hydrogenated block copolymer(s) obtained by hydrogenating block copolymer(s) of formula(e) A—(—B—A)n and/or A—B (where A represents a polymer block of a monovinyl-substituted aromatic hydrocarbon; B represents a polymer block of a conjugated diene elastomer; n represents an integer of from 1 to 5), and which has/have a melt flow rate (at 200° C. under 5 kg) of 2 g/10 minutes or less and in which the block A content is 27% by weight or more, at a degree of hydrogenation of 90 mol % or more.

a weight ratio of the hydrogenated block copolymer(s) (b) to the hydrogenated block copolymer(s) (c), being from 0.25 to 4.0; and (d) from 7 to 25% by weight of talc having a mean particle size of from 3 to 5 μm measured by laser diffraction, a BET specific surface area of from 5 to 13 m$^2$/g and a top-cut particle size of less than 20 μm.

2. The polypropylene resin composition for car interior fittings as claimed in claim 1, in which the crystalline polypropylene (a) is a crystalline ethylene-propylene block copolymer having an ethylene content of from 0.5 to 8% by weight where the polypropylene component has a boiling n-heptane-insoluble content of 95% by weight or more and the isotactic pentad fraction in the boiling n-heptane-insoluble moiety is 0.970 or more.

3. The polypropylene resin composition for car interior fittings as claimed in claim 2, in which the crystalline ethylene-propylene block copolymer has a room-temperature p-xylene-soluble content of from 4 to 20% by weight where the room-temperature p-xylene-soluble moiety has an ethylene content of from 20 to 45% by weight and has a intrinsic viscosity (at 135° C. in decalin) of 4 dl/g or more.

4. The polypropylene resin composition for car interior fittings as claimed in claim 1, which additionally contains from 0 to 200 parts by weight, relative to 100 parts by weight of the sum of the hydrogenated block copolymers (b) and (c), of an ethylene-propylene copolymer rubber (e) having an ethylene content of from 60 to 80% by weight and a Mooney viscosity, ML 1+4 (at 100° C.) of from 10 to 70, and/or an ethylene-propylene-diene copolymer rubber (f) having an ethylene content of from 60 to 80% by weight, and/or an ethylene-butene copolymer rubber (g) having a butene content of from 10 to 25% by weight and a Mooney viscosity, ML 1+4 (at 100° C.) of from 5 to 20.

5. The resin of claim 1, wherein the weight percentage of the first mentioned hydrogenated block copolymer is 3 to 7%, the weight percentage of the second mentioned hydrogenated block copolymer is 2 to 7%, the weight percentage of the talc is 10 to 24%, and the weight ratio is from 1.0 to 1.5.

* * * * *